United States Patent
Ishii et al.

(10) Patent No.: US 9,438,885 B2
(45) Date of Patent: Sep. 6, 2016

(54) THREE DIMENSIONAL IMAGING DEVICE AND IMAGE PROCESSING DEVICE

(75) Inventors: Yasunori Ishii, Osaka (JP); Masao Hiramoto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 728 days.

(21) Appl. No.: 13/517,066

(22) PCT Filed: Aug. 19, 2011

(86) PCT No.: PCT/JP2011/004627
§ 371 (c)(1),
(2), (4) Date: Jun. 19, 2012

(87) PCT Pub. No.: WO2012/053143
PCT Pub. Date: Apr. 26, 2012

(65) Prior Publication Data
US 2012/0262551 A1 Oct. 18, 2012

(30) Foreign Application Priority Data

Oct. 21, 2010 (JP) ................................ 2010-236131

(51) Int. Cl.
*H04N 13/02* (2006.01)
(52) U.S. Cl.
CPC ................................ *H04N 13/0214* (2013.01)
(58) Field of Classification Search
CPC ................ H04N 13/0214; H04N 13/025
USPC ................................................ 348/46, 60
See application file for complete search history.

(56) References Cited

U.S. PATENT DOCUMENTS

| | | | |
|---|---|---|---|
| 6,977,674 B2 * | 12/2005 | Seo | 348/207.99 |
| 2002/0021832 A1 * | 2/2002 | Dawson | 382/154 |
| 2002/0171740 A1 | 11/2002 | Seo | |

(Continued)

FOREIGN PATENT DOCUMENTS

| | | |
|---|---|---|
| JP | 02-171737 A | 7/1990 |
| JP | 2002-513145 T | 5/2002 |

(Continued)

OTHER PUBLICATIONS

International Search Report for corresponding International Application No. PCT/JP2011/004627 mailed Dec. 13, 2011.

(Continued)

*Primary Examiner* — Christopher Findley
(74) *Attorney, Agent, or Firm* — Renner, Otto, Boisselle & Sklar, LLP

(57) ABSTRACT

The 3D image capture device includes a light-transmitting section with n transmitting areas (where n is an integer and n≥2) that have different transmission wavelength ranges and each of which transmits a light ray falling within a first wavelength range, a solid-state image sensor that includes a photosensitive cell array having a number of unit blocks, and a signal processing section that processes the output signal of the image sensor. Each unit block includes n photosensitive cells including a first photosensitive cell that outputs a signal representing the quantity of the light ray falling within the first wavelength range. The signal processing section generates at least two image data with parallax by using a signal obtained by multiplying a signal supplied from the first photosensitive cell by a first coefficient, which is real number that is equal to or greater than zero but less than one.

10 Claims, 9 Drawing Sheets

(56) References Cited

U.S. PATENT DOCUMENTS

| | | |
|---|---|---|
| 2003/0169359 A1 | 9/2003 | Merrill et al. |
| 2009/0284627 A1* | 11/2009 | Bando et al. .................. 348/273 |
| 2010/0128152 A1 | 5/2010 | Hayasaka et al. |
| 2011/0050941 A1 | 3/2011 | Hiramoto et al. |

FOREIGN PATENT DOCUMENTS

| | | |
|---|---|---|
| JP | 2002-344999 A | 11/2002 |
| JP | 2003-134533 A | 5/2003 |
| JP | 2009-276294 A | 11/2009 |
| JP | 2010-154493 A | 7/2010 |
| WO | 2010/058545 A1 | 5/2010 |

OTHER PUBLICATIONS

Co-pending U.S. Appl. No. 13/511,029, filed May 21, 2012.

* cited by examiner

C1

C2

THREE DIMENSIONAL IMAGING DEVICE AND IMAGE PROCESSING DEVICE

TECHNICAL FIELD

The present invention relates to a single-lens 3D image capturing technology for generating multiple images with parallax.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax by using a single camera have been researched and developed. For example, Patent Document No. 1 discloses a technique for obtaining two images with parallax at the same time using color filters. FIG. 11 schematically illustrates an image capturing system that adopts such a technique. The image capturing system that uses that technique includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film 21. In the meantime, only red- and blue-based light rays are respectively transmitted through the two color filters 20a and 20b of the light beam confining plate 20. As a result, a magenta-based color image is produced on the photosensitive film by the light rays that have been transmitted through the two color filters. In this case, since the color filters 20a and 20b are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 1, images with parallax can be produced using the two color filters.

According to the technique disclosed in Patent Document No. 1, the light rays are imaged on the photosensitive film, thereby producing images with parallax there. Meanwhile, Patent Document No. 2 discloses a technique for producing images with parallax by transforming incoming light into electrical signals. FIG. 12 schematically illustrates a light beam confining plate according to such a technique. Specifically according to that technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 3 also discloses a technique for obtaining images with parallax using a similar configuration to the one illustrated in FIG. 12. FIG. 13 schematically illustrates a light beam confining plate as disclosed in Patent Document No. 3. According to that technique, by making the incoming light pass through R, G and B areas 23R, 23G and 23B of the light beam confining plate 23, images with parallax can also be produced.

According to the techniques disclosed in Patent Documents Nos. 1 to 3 mentioned above, images with parallax can be produced by arranging RGB color filters on a light beam confining plate. However, since the light beam confining plate is used, the percentage of the incoming light that can be used eventually decreases. In addition, to increase the effect of parallax, the RGB color filters should be arranged at distant positions and should have decreased areas. In that case, however, the percentage of the incoming light that can be used eventually further decreases.

Unlike these techniques, Patent Document No. 4 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 2-171737
Patent Document No. 2: Japanese Laid-Open Patent Publication No. 2002-344999
Patent Document No. 3: Japanese Laid-Open Patent Publication No. 2009-276294
Patent Document No. 4: Japanese Laid-Open Patent Publication No. 2003-134533

SUMMARY OF INVENTION

Technical Problem

According to any of these known techniques, multiple images with parallax can be certainly obtained, but the quantity of the light received by the image sensor is smaller than usual because color filters are used for a light beam confining plate. In order to receive a sufficient quantity of incoming light, a normal image that uses the incoming light highly efficiently could be obtained by using some mechanism that removes the color filters from the optical path by mechanical driving. If such a method is adopted, however, the overall size of the device increases too much and the manufacturing cost becomes too high.

The present invention provides a 3D image capturing technique for generating multiple images that have parallax for any color component without performing any mechanical driving but with the incoming light used highly efficiently.

Solution to Problem

A 3D image capture device according to the present invention includes: a light-transmitting section with n transmitting areas (where n is an integer that is equal to or greater than two) that have mutually different transmission wavelength ranges, each said transmitting area transmitting a light ray falling within a first wavelength range; a solid-state image sensor which includes a photosensitive cell array and which is arranged so as to receive the light that has been transmitted through the light-transmitting section, the photosensitive cell array including a number of unit blocks, each said unit block including n photosensitive cells, including a first photosensitive cell that outputs a photoelectrically converted signal representing the quantity of the light ray falling within the first wavelength range, the n photosensitive cells outputting photoelectrically converted signals representing the respective quantities of light rays falling within mutually different wavelength ranges; an optical system which produces an image on an imaging area of the solid-state image sensor; and a signal processing section which generates signals representing the quantities of light rays that have been incident on the respective areas of the light-transmitting section using not only a signal which is obtained by multiplying the photoelectrically converted signal supplied from the first photosensitive cell by a first coefficient, which is a real number that is equal to or greater than zero but less than one, but also the photoelectrically converted signals supplied from the other photosensitive cells, thereby generating at least two image data with parallax.

In one embodiment, n==3, one of the n transmitting areas included in the light-transmitting section is a transparent area, and the other two are chosen from three areas that transmit light rays falling within cyan, magenta and yellow wavelength ranges.

In one embodiment, two of the n transmitting areas are an area that transmits a light ray falling within the cyan wavelength range and an area that transmits a light ray falling within the yellow wavelength range, and the first wavelength range is a wavelength range associated with the color green.

In one embodiment, the value of the first coefficient is determined on a unit block basis.

In one embodiment, the value of the first coefficient is determined based on the ratio of the photoelectrically converted signal that has been output from the first photosensitive cell of each said unit block to the sum of the photoelectrically converted signals that have been output from the other photosensitive cells thereof.

In one embodiment, the signal processing section generates signals representing the quantities of light rays that have been incident on the respective areas of the light-transmitting section using the sums of a signal which is obtained by multiplying the photoelectrically converted signal supplied from the first photosensitive cell by a second coefficient, which is a real number that is greater than zero but equal to or smaller than one, and the photoelectrically converted signals supplied from the other photosensitive cells.

In one embodiment, the value of the second coefficient is determined based on the value of the first coefficient.

In one embodiment, if the values of the first and second coefficients are identified by k and k', respectively, k'=1−k.

An image processor according to the present invention processes a signal that has been obtained by a 3D image capture device. The device includes: a light-transmitting section with n transmitting areas (where n is an integer that is equal to or greater than two) that have mutually different transmission wavelength ranges, each said transmitting area transmitting a light ray falling within a first wavelength range; a solid-state image sensor which includes a photosensitive cell array and which is arranged so as to receive the light that has been transmitted through the light-transmitting section, the photosensitive cell array including a number of unit blocks, each said unit block including n photosensitive cells, including a first photosensitive cell that outputs a photoelectrically converted signal representing the quantity of the light ray falling within the first wavelength range, the N photosensitive cells outputting photoelectrically converted signals representing the respective quantities of light rays falling within mutually different wavelength ranges; and an optical system which produces an image on an imaging area of the solid-state image sensor. The image processor generates signals representing the quantities of light rays that have been incident on the respective areas of the light-transmitting section using not only a signal which is obtained by multiplying the photoelectrically converted signal supplied from the first photosensitive cell by a first coefficient, which is a real number that is equal to or greater than zero but less than one, but also the photoelectrically converted signals supplied from the other photosensitive cells, thereby generating at least two image data with parallax.

Advantageous Effects of Invention

According to the present invention, multiple images that have parallax for any color component can be generated with high optical efficiency even without performing any mechanical driving but by using an image sensor with color filters.

DESCRIPTION OF EMBODIMENTS

Figure 1:
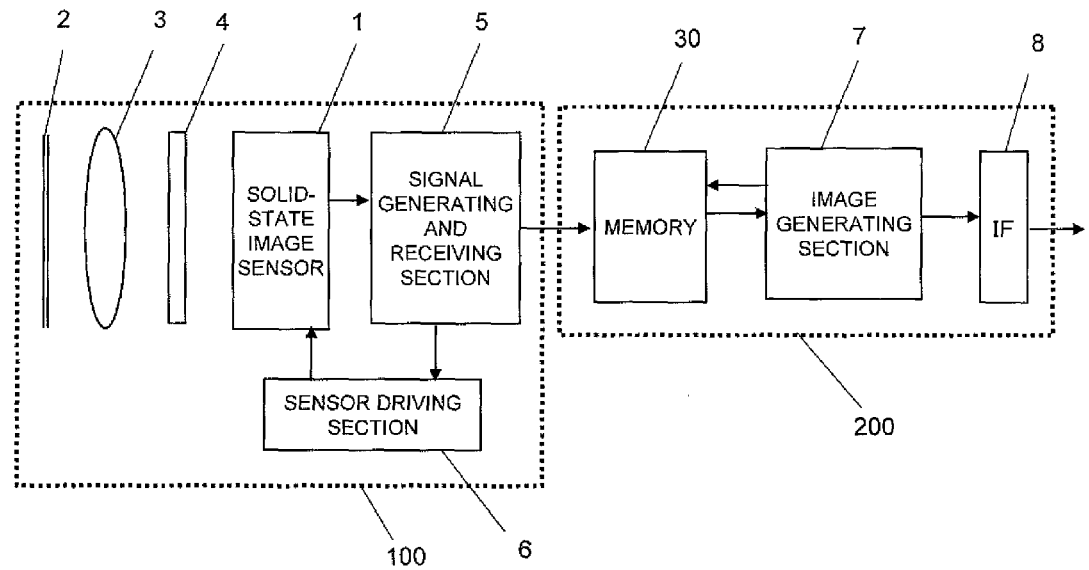
FIG. 1 A block diagram illustrating an overall configuration for an image capture device according to a first embodiment.

Hereinafter, embodiments of the present invention will be described with reference to the accompanying drawings. In the following description, any element shown in multiple drawings and having substantially the same function will be identified by the same reference numeral. It should be noted that a signal or information representing an image will be sometimes referred to herein as just an "image".

Embodiment 1

FIG. 1 is a block diagram illustrating an overall configuration for a 3D image capture device (which will be simply referred to herein as an "image capture device") as a first embodiment of the present invention. The image capture device of this embodiment is a digital electronic camera and includes an image capturing section 100 and a signal processing section 200 that receives a signal from the image capturing section 100 and outputs a signal representing an image (i.e., an image signal). The image capture device of this embodiment may have the capability of shooting a moving picture, not just still pictures.

The image capturing section 100 includes an image sensor 1 with a number of photosensitive cells that are arranged on its imaging area, a light-transmitting plate (light-transmitting section) 2, which has three transmitting areas that have mutually different transmission wavelength ranges and which transmits the incoming light, an optical lens 3 for producing an image on the imaging area of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 1 is typically a CCD or CMOS sensor, which may be fabricated by known semiconductor device processing technologies. The signal generating and receiving section 5 and the sensor driving section 30 may be implemented as an LSI such as a CCD driver.

The signal processing section 200 includes an image generating section 7 for generating an image signal by processing the signal supplied from the image capturing section 100, a memory 30 for storing various kinds of data for use to generate the image signal, and an interface (I/F) section 8 for sending out the image signal thus generated to an external device. The signal processing section 200 further includes a parallax estimating section 40 for estimating parallax between the multiple images that have been generated by the image generating section 7 and a distance information generating section 50 for generating information about the distance to the subject based on the parallax estimated. The image generating section 7, the parallax estimating section 40 and the distance information generating section 50 may be a combination of a hardware component such as a known digital signal processor (DSP) and a software program for use to perform image processing involving the image signal generation, the parallax estimation and the distance information generation to be described later. The memory 30 may be a DRAM, for example. And the memory 30 not only stores the signal supplied from the image capturing section 100 but also temporarily retains the image data that has been generated by the image generating section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, the description thereof will be omitted herein because none of them are essential components that would make it difficult to understand how the present invention works unless they were described in detail.

Next, the configuration of the image capturing section 100 will be described in further detail with reference to FIGS. 2 through 4.

Figure 2:
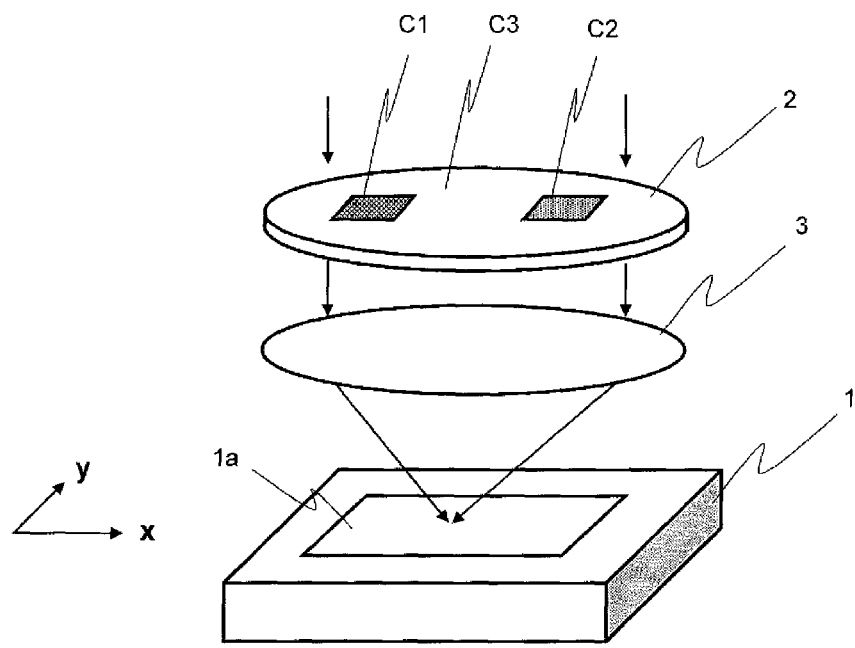
FIG. 2 A view generally illustrating the relative arrangement of a light-transmitting plate, an optical system and an image sensor according to the first embodiment.

FIG. 2 schematically illustrates the relative arrangement of the light-transmitting plate 2, the lens 3 and the image sensor 1 in the image capturing section 100. It should be noted that illustration of the other elements is omitted in FIG. 2. The light-transmitting plate 2 has three transmitting areas C1, C2 and C3 that have mutually different transmission wavelength ranges and transmits the incoming light. The lens 3 is a known lens and condenses the light that has been transmitted through the light-transmitting plate 2, thereby imaging the light on the imaging area 1a of the image sensor 1. In the following description, on a plane parallel to the imaging area 1a, the direction that points from the area C1 toward the area C2 will be referred to herein as "x direction" and the direction that is defined perpendicularly to the x direction will be referred to herein as "y direction".

It should be noted that the arrangement of the respective members shown in FIG. 2 is only an example of the present invention. And the present invention is in no way limited to that specific embodiment. Alternatively, as long as an image can be produced on the imaging area 1a, the lens 3 may be arranged more distant from the image sensor 1 than the light-transmitting plate 2 is. Still alternatively, the lens 3 may be a lens unit consisting of multiple lenses and the light-transmitting plate 2 may be interposed between those lenses 3. Furthermore, the lens 3 and the light-transmitting plate 2 do not always have to be two independent members but may also be implemented as a single optical element. What is more, the light-transmitting plate 2 and the imaging area of the image sensor 1 do not always have to be arranged parallel to each other. For example, by arranging an optical element that reflects light such as a mirror or a prism between the light-transmitting plate 2 and the image sensor 1, the light-transmitting plate 2 and the imaging area of the image sensor 1 may be arranged on two planes that intersect with each other.

Figure 3:
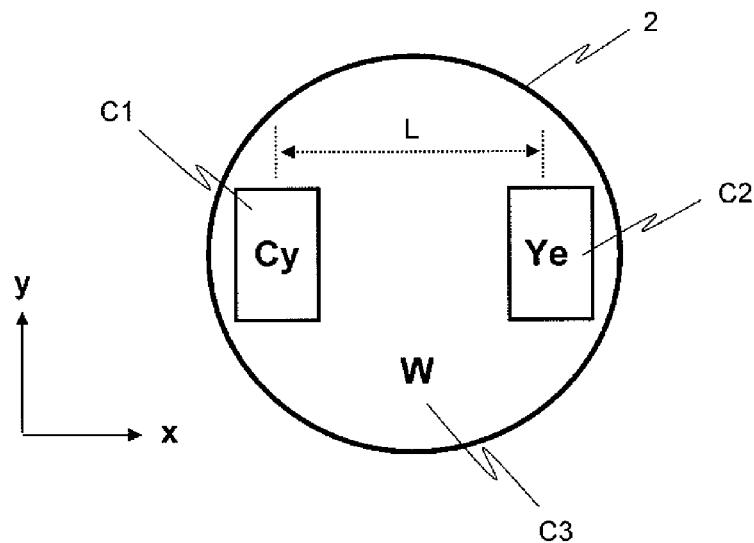
FIG. 3 A view illustrating an arrangement of transmitting areas on a light-transmitting plate according to the first embodiment.

FIG. 3 is a front view of the light-transmitting plate 2 of this embodiment. The light-transmitting plate 2, as well as the lens 3, has a circular shape in this embodiment but may also have any other shape. In the area C1, arranged is a color filter that transmits a light ray falling within the cyan (Cy) wavelength range (i.e., green and blue wavelength ranges). Such a filter will be referred to herein as a "Cy filter". In the area C2, arranged is a color filter that transmits a light ray falling within the yellow (Ye) wavelength range (i.e., red and green wavelength ranges). Such a filter will be referred to herein as a "Ye filter".

It should be noted that as long as these areas C1 and C2 of this embodiment are configured so as to transmit only a light ray falling within the Cr wavelength range and only a light ray falling within the Ye wavelength range, respectively, and not to transmit a light ray falling within any other wavelength range, the areas C1 and C2 do not have to be color filters but may be any other kind of members. For example, each of these areas C1 and C2 may be a dichroic mirror or any other optical element that transmits a light ray falling within a particular wavelength range and reflects a light ray falling within any other wavelength range. In this example, the areas C1 and C2 are spaced apart from each other in the x direction. The distance L between the areas C1 and C2 is determined by the size of the lens 3 so that the image obtained will have appropriate parallax, and may be set to be within the range of several millimeters to several centimeters, for example. Meanwhile, the other area C3 of the light-transmitting plate 2 is a transparent area, which is made of a transparent member that transmits visible radiation included in white light (W) and falling within the entire wavelength range. The transparent member may be made of any material as long as the transparent member can transmit light with high transmittance. In this embodiment, the areas C1 and C2 are designed to have the same planar area and the area C3 is designed to have a larger planar area than the areas C1 and C2.

On the imaging area 1a of the image sensor 1 shown in FIG. 2, there is an array of photosensitive cells that are arranged two-dimensionally and an array of color filters that are arranged to face those photosensitive cells in the array. The array of photosensitive cells and the array of color filters consist of multiple unit blocks. And each unit block includes four photosensitive cells and four associated color filters that face them. Each of those photosensitive cells is typically a photodiode, which performs photoelectric conversion and outputs an electrical signal representing the quantity of the light received (which will be referred to herein as a "photoelectrically converted signal" or a "pixel signal"). On the other hand, each color filter may be made of a known pigment and is designed so as to selectively transmit a light ray falling within a particular wavelength range.

Figure 4:
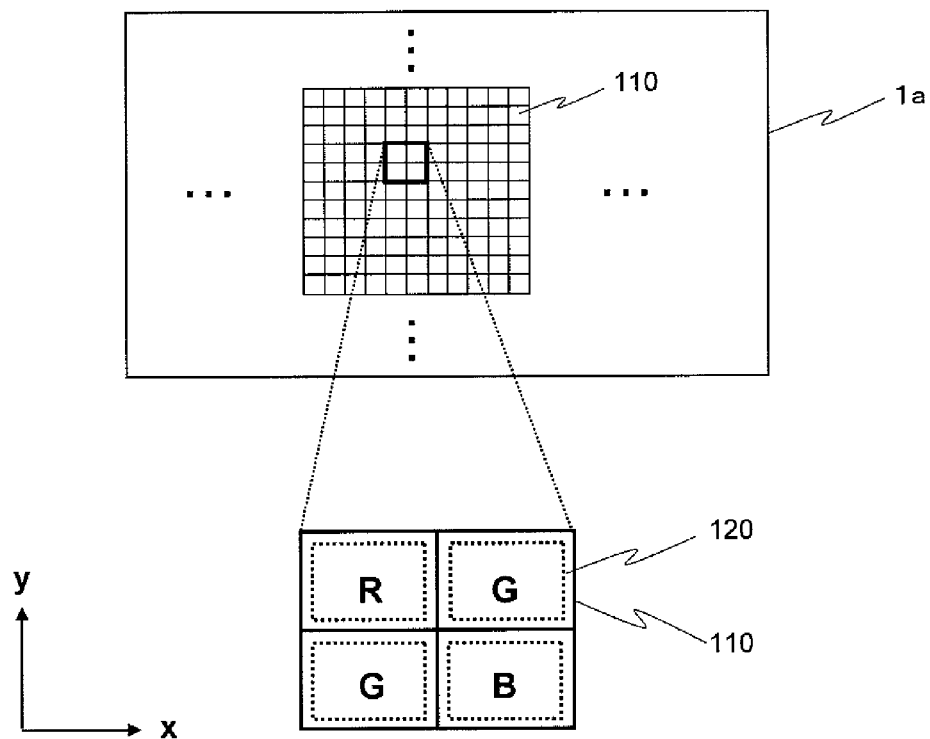
FIG. 4 A view illustrating an arrangement of pixels on an image sensor according to the first embodiment.

FIG. 4 schematically illustrates a part of the array of photosensitive cells and a part of the array of color filters. A lot of photosensitive cells 120 and color filters 110 that face them one to one are arranged in columns and rows on the imaging area 1a. In this embodiment, four photosensitive cells 120 that are arranged close to each other form one unit block. In each unit block, a color filter that transmits a light ray falling within the red (R) wavelength range (i.e., an R filter) is arranged at the row 1, column 1 position, color filters that transmit a light ray falling within the green (G) wavelength range (i.e., G filters) are arranged at the row 1, column 2 position and at the row 2, column 1 position, and a color filter that transmits a light ray falling within the blue (B) wavelength range (i.e., a B filter) is arranged at the row 2, column 2 position. As can be seen, the arrangement of the color filters 110 according to this embodiment is a known Bayer arrangement consisting basically two rows and two columns. However, the photosensitive cells 120 and the color filters 110 do not have to have the Bayer arrangement but may also have any other known arrangement.

According to such an arrangement, the light that has entered this image capture device during an exposure process passes through the light-transmitting plate 2, the lens 3, the infrared cut filter 4 and the color filters 110 and then is incident on the photosensitive cells 120. Each of those photosensitive cells 120 receives a light ray that has been transmitted through the area C1, C2 or C3 of the light-transmitting plate 2 and then through its associated color filter, and outputs a photoelectrically converted signal representing the quantity (or the intensity) of the light received. The photoelectrically converted signal that has been output from each photosensitive cell is sent to the signal processing section 200 by way of the signal generating and receiving section 5. In the signal processing section 200, the image generating section 7 generates a right-eye image, a left-eye image, and a color image based on the signals supplied from the image capturing section 100.

Although the image sensor 1 of this embodiment makes color separation using the array of color filters described above, an image sensor that uses no array of color filters may also be used according to the present invention. For example, an image sensor with a triple well structure as disclosed in PCT International Application Japanese National Phase Patent Publication 2002-513145 may also be used. Thus, as long as each unit block includes R, G and B sensing cells that sense light rays falling within the red, green and blue wavelength ranges, respectively, any image sensor may be used.

Also, in the embodiment described above, each photosensitive cell is supposed to sense a light ray falling within the red, green or blue wavelength range. However, the sensing wavelength range of each photosensitive cell may be further subdivided. For example, the red wavelength range $\lambda r$ may be subdivided into three wavelength ranges $\lambda r1$, $\lambda r2$ and $\lambda r3$ and three photosensitive cells associated with these wavelength ranges $\lambda r1$, $\lambda r2$ and $\lambda r3$ may be provided. In that case, the sum of the pixel signals provided by the three photosensitive cells may be processed as a signal representing a red ray.

Hereinafter, the photoelectrically converted signals supplied from those photosensitive cells will be described. First of all, signals representing the intensities of light rays that have been incident on the areas C1, C2 and C3 of the light-transmitting plate 2 will be identified herein by Ci1, Ci2 and Ci3, respectively, with a subscript "i" added. Also, the spectral transmittance of the transparent area C3 of the light-transmitting plate 2, the lens 3 and the infrared cut filter 4 combined will be identified herein by Tw. And the spectral transmittances of the Cy and Ye filters will be identified herein by Tcy and Tye, respectively. In the same way, the spectral transmittances of the R, G and B color filters will be identified herein by Tr, Tg and Tb, respectively. In this case, Tw, Tcy, Tye, Tr, Tg and Tb are functions that depend on the wavelength $\lambda$ of the incoming light. Also, signals representing the intensities of light rays that have been transmitted through the R, G and B color filters and then received by photosensitive cells right under those color filters will be identified herein by Rs, Gs and Bs, respectively, with a subscript "s" added. Furthermore, the integration operation of the spectral transmittances in the visible radiation wavelength range will be identified herein by the sign $\Sigma$. For example, an integration operation $\int TwTcyTrd\lambda$ with respect to the wavelength $\lambda$ will be identified herein by $\Sigma TwTcyTr$. In this case, the integration is supposed to be performed in the entire visible radiation wavelength range. Then, Rs is proportional to the sum of $Ci1\Sigma TwTcyTr$, $Ci2\Sigma TwTyeTr$ and $Ci3\Sigma TwTr$. Likewise, Gs is proportional to the sum of $Ci1\Sigma TwTcyTg$, $Ci2\Sigma TwTyeTg$ and $Ci3\Sigma TwTg$. And Bs is proportional to the sum of $Ci1\Sigma TwTcyTb$, $Ci2\Sigma TwTyeTb$ and $Ci3\Sigma TwTb$. Supposing the constant of proportionality with respect to these relations is one, Rs, Gs and Bs can be represented by the following Equations (1), (2) and (3), respectively:

$$Rs = Ci1\Sigma TwTcyTr + Ci2\Sigma TwTyeTr + Ci3\Sigma TwTr \quad (1)$$

$$Gs = Ci1\Sigma TwTcyTg + Ci2\Sigma TwTyeTg + Ci3\Sigma TwTg \quad (2)$$

$$Bs = Ci1\Sigma TwTcyTb + Ci2\Sigma TwTyeTb + Ci3\Sigma TwTb \quad (3)$$

If $\Sigma TwTcyTr$, $\Sigma TwTyeTr$ and $\Sigma TwTr$ of Equation (1) are represented by Mx11, Mx12 and Mx13, respectively, and if $\Sigma TwTcyTg$, $\Sigma TwTyeTg$ and $\Sigma TwTg$ of Equation (2) are represented by Mx21, Mx22 and Mx23, respectively, and if $\Sigma TwTcyTb$, $\Sigma TwTyeTb$ and $\Sigma TwTb$ of Equation (3) are represented by Mx31, Mx32 and Mx33, respectively, then the relation between Rs, Gs and Bs and Ci1, Ci2 and Ci3 can be given as a matrix by the following Equation (4):

$$\begin{pmatrix} Rs \\ Gs \\ Bs \end{pmatrix} = \begin{pmatrix} Mx11 & Mx12 & Mx13 \\ Mx21 & Mx22 & Mx23 \\ Mx31 & Mx32 & Mx33 \end{pmatrix} \begin{pmatrix} Ci1 \\ Ci2 \\ Ci3 \end{pmatrix} \quad (4)$$

Supposing the respective elements of an inverse matrix, which is obtained by inverting the matrix consisting of the elements Mx11 through Mx33 as represented by Equation (4), are identified by iM11 through iM33, respectively, Equation (4) can be modified into the following Equation (5). That is to say, the signals representing the intensities of the light rays that have been incident on the areas C1, C2 and C3 can be represented by using the photoelectrically converted signals Rs, Gs and Bs:

$$\begin{pmatrix} Ci1 \\ Ci2 \\ Ci3 \end{pmatrix} = \begin{pmatrix} iM11 & iM12 & iM13 \\ iM21 & iM22 & iM23 \\ iM31 & iM32 & iM33 \end{pmatrix} \begin{pmatrix} Rs \\ Gs \\ Bs \end{pmatrix} \quad (5)$$

The image generating section 7 (see FIG. 1) carries out a signal arithmetic operation based on this Equation (5), thereby generating signals Ci1, Ci2 and Ci3 on a unit block basis. These signals Ci1, Ci2 and Ci3 that have been generated on a unit block basis represent three images that have been produced by the light rays that were incident on the areas C1, C2 and C3, respectively. Among other things, the images represented by the signals Ci1 and Ci2 correspond to the images obtained by viewing the subject from the areas C1 and C2 that are spaced apart from each other in the x direction, and therefore, can be handled as a left-eye image and a right-eye image, respectively. That is to say, the two images represented by the signals Ci1 and Ci2 have parallax corresponding to the distance between the two areas C1 and C2. Consequently, information about the depth of the subject can be obtained from these images.

The image signals Ci1, Ci2 and Ci3 that have been obtained through the processing described above are represented by photoelectrically converted signals Rs, Gs and Bs but correspond to grayscale images (i.e., monochrome images), not color images. In order to obtain a color image instead of a grayscale image, normal color processing using a Bayer arrangement may be carried out on the photoelectrically converted signals thus obtained, instead of the signal arithmetic processing described above. In that case, some loss of the incoming light and a variation in color temperature may be caused by the Cy and Ye filters of the light-transmitting plate 2. However, as these color filters have high optical transmittance, the loss of the incoming light can be smaller than in the related art. Also, even an overall color shift, if any, can be coped with by adjusting the white balance. Thus, the image capture device of this embodiment can obtain a good color image by using the incoming light highly efficiently.

Optionally, instead of performing normal color processing using a Bayer arrangement on the respective photoelectrically converted signals in order to obtain a color image, color information may also be obtained by using only the Ci3 term of Equation (4). That is to say, even by obtaining Ci3 by Equation (5) and then regarding Mx13×Ci3, Mx23×Ci3 and Mx33×Ci3 as representing the quantities of R, G and B light rays, respectively, a color image can also be obtained.

Two images with parallax can be certainly obtained by performing the processing described above. However, if a lot of green ray is included in the light reflected from the subject, then accurate parallax information cannot be obtained, which is a problem. In this embodiment, the transmitting areas of the light-transmitting plate 2 use a Cy filter, a Ye filter and a transparent member. Each of these transmitting areas transmits a green ray in any of the Cy and Ye filters and the transparent member. The "green ray" generally refers to a wavelength range of around 490 nm to 575 nm, although the range will vary slightly depending on what color filter is used. That is why the green ray incident on the image sensor 1 becomes the superposition of the green rays that have been transmitted through the respective transmitting areas of the Cy and Ye filters and the transparent member. Consequently, a photosensitive cell that senses the green ray cannot selectively receive one of light rays that have come from multiple different directions, which is a requirement to be satisfied to generate multiple images with parallax.

Figure 5:
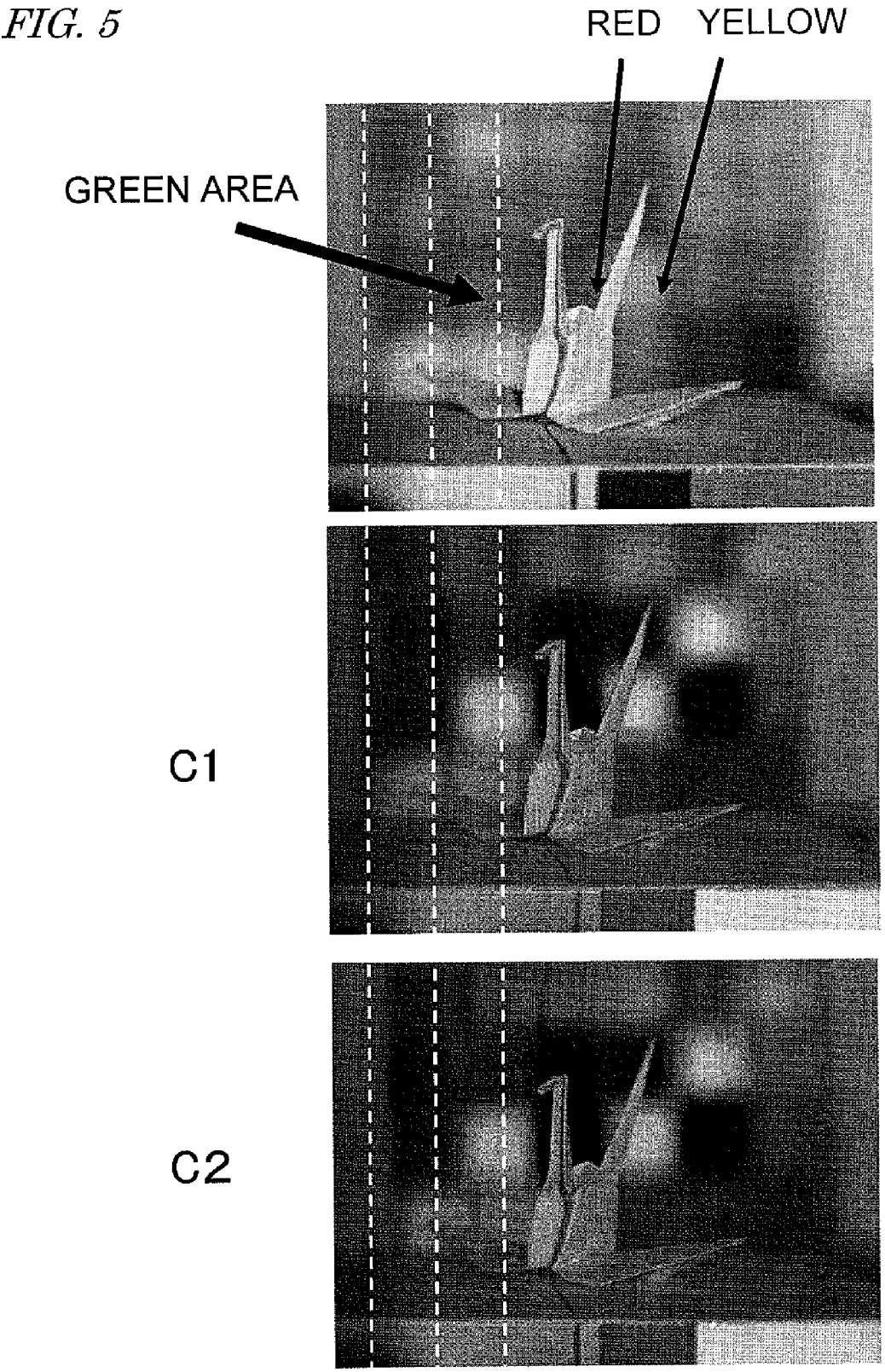
FIG. 5 Shows images generated by an image capture device according to the first embodiment through a first method.

FIG. 5 shows three exemplary images generated by performing the processing described above. In FIG. 5, the top image is an image shot that is displayed in grayscales, while the middle and bottom images show two images with parallax that have been generated based on the image signals Ci1 and Ci2, respectively. On the background of these images, a color chart is put to compare their colors. The arrows at the top of FIG. 5 indicate what colors some sections of the color chart represent. Comparing the images shown at the middle and bottom of FIG. 5 to each other, it can be seen that the background shown at the middle of FIG. 5 has shifted to the left with respect to the background shown at the bottom of FIG. 5. As for the green area indicated by the arrow (i.e., an area that reflects a light ray falling within the green wavelength range), however, there is no parallax there, and therefore, that area looks no different between the middle and the bottom of FIG. 5 and their brightness is the same, too.

Thus, to overcome such a problem, according to this embodiment, in an area where the signal Gs that does not contribute to calculating the parallax dominates the signals Rs and Gs that do contribute to calculating the parallax, the percentage of Gs for use to calculate the parallax is reduced, thereby generating images with parallax that would make the viewer feel much less unnaturalness. Specifically, by multiplying the signal Gs obtained by k (where k is a real number that is equal to or greater than zero but less than one), the percentage of the green component included in the signal representing the quantity of the light ray that has been incident on each transmitting area is reduced. Then, Equations (4) and (5) described above can be rewritten into the following Equations (6) and (7), respectively:

$$\begin{pmatrix} Rs \\ kGs \\ Bs \end{pmatrix} = \begin{pmatrix} Mx11 & Mx12 & Mx13 \\ kMx21 & kMx22 & kMx23 \\ Mx31 & Mx32 & Mx33 \end{pmatrix} \begin{pmatrix} Ci1 \\ Ci2 \\ Ci3 \end{pmatrix} \quad (6)$$

$$\begin{pmatrix} Ci1 \\ Ci2 \\ Ci3 \end{pmatrix} = \begin{pmatrix} Mx11 & Mx12 & Mx13 \\ kMx21 & kMx22 & kMx23 \\ Mx31 & Mx32 & Mx33 \end{pmatrix}^{-1} \begin{pmatrix} Rs \\ kGs \\ Bs \end{pmatrix} \quad (7)$$

In Equation (7), the superscript "−1" added to the right-hand side of the matrix means an inverse matrix. Nevertheless, if k is equal to zero, then the matrix will consist of two rows and three columns, and therefore, will be a pseudo inverse matrix. The other letters indicate the same as what their counterparts indicate in Equations (4) and (5).

The coefficient k may be determined either on an image-by-image basis or on a unit block basis. If k is determined on an image-by-image basis, the percentage of the green component to the entire scene may be obtained and the ratio of the quantity of the green ray to the entire quantity of light may be set to be the value of the coefficient k in that image. On the other hand, if k is determined on a unit block basis, k may be determined using the Rs, Gs and Bs values. For example, the coefficient k may be determined by the following Equation (8):

$$k = ((Rs+Bs) \div 2) \div Gs \div Max \quad (8)$$

According to Equation (8), if Gs is greater than Rs and Bs, then the k value may be set to be a smaller value. In Equation (8), Max indicates the maximum value of the signal that the image sensor can have. For example, if a signal is represented by 8 bits, then the Max value is 255.

It should be noted that Equation (8) is just an example of an equation for determining k. Rather any other transformation may also be used as long as k increases when the quantity of the green ray is smaller than that of the red or blue ray but decreases when the quantity of the green ray is greater than that of the red or blue ray.

Figure 6:
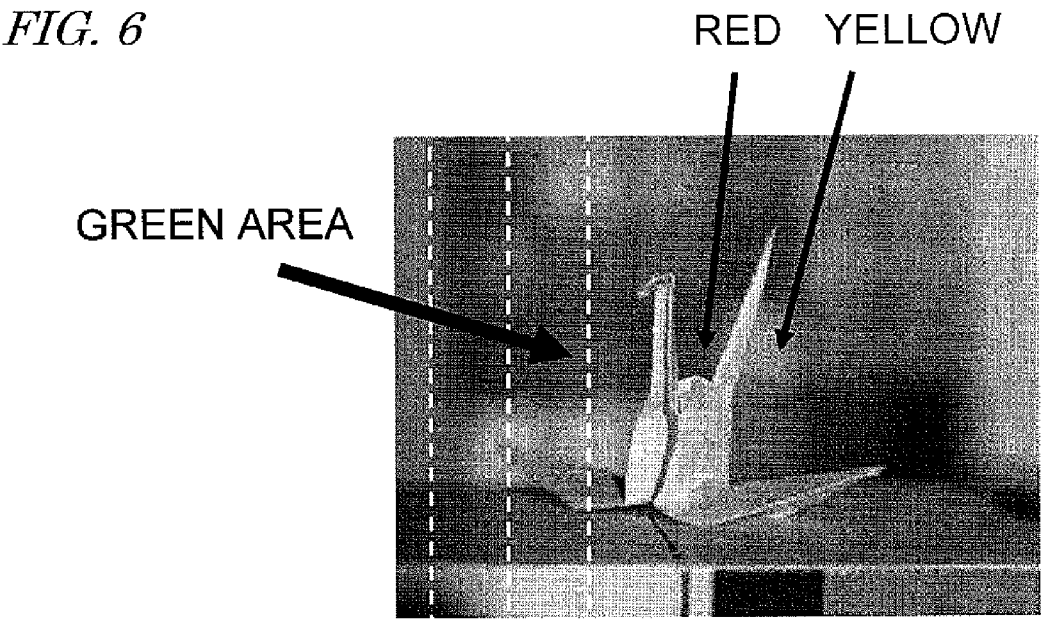
FIG. 6 Shows images generated by an image capture device according to the first embodiment with the percentage of a G component reduced.
Figure 6:
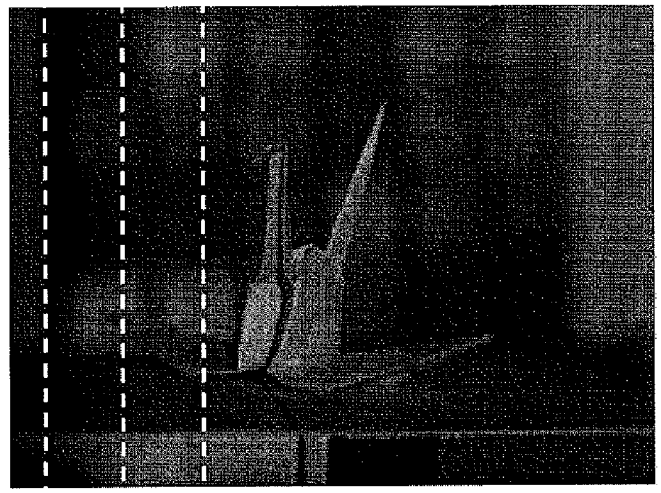
Figure 6:
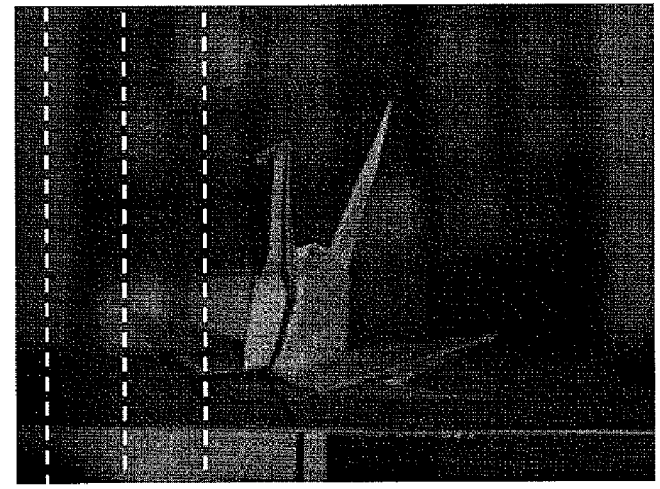

The images represented by the signals Ci1 and Ci2 that have been calculated by Equation (7) are shown at the middle and bottom of FIG. 6. The other image shown at the top of FIG. 6 is the same as what is shown at the top of FIG. 5. As can be seen from FIG. 6, two images with parallax that would make the viewer feel little unnaturalness as far as the grayscale is concerned can be obtained.

Figure 7:
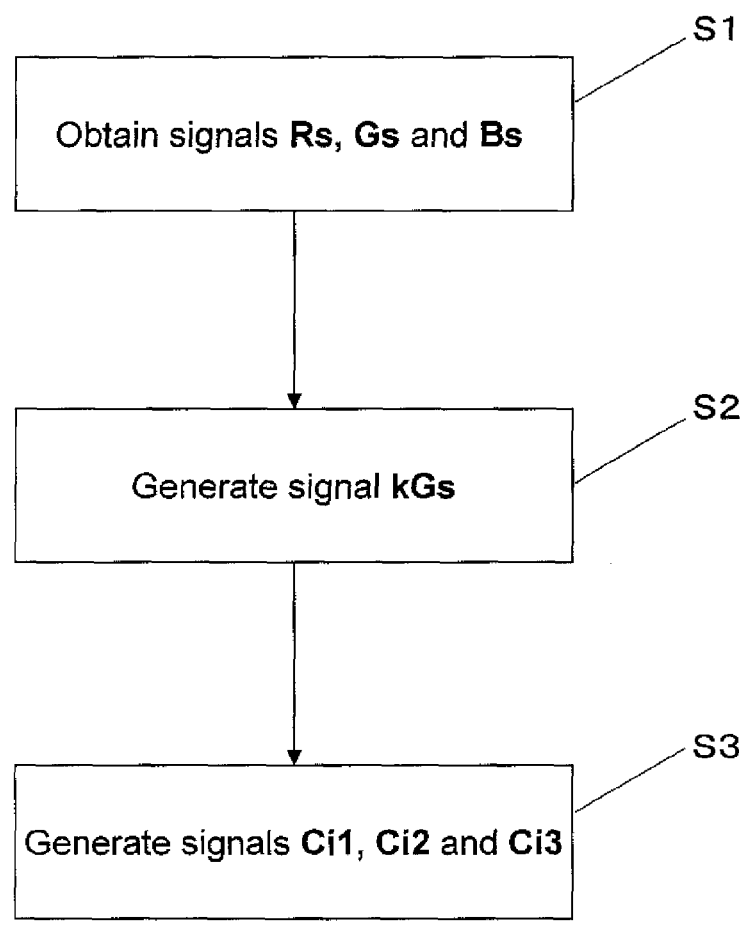
FIG. 7 A chart showing the procedure of the processing performed by an image generating section according to the first embodiment.

The procedure of the signal processing to be carried out by the image generating section 7 on a unit block basis is shown in FIG. 7. First of all, in Step S1, the image generating section 7 obtains signals Rs, Gs and Bs. Next, in Step S2, the image generating section 7 multiplies the signal Gs by k, thereby generating a signal kGs. Subsequently, in Step S3, the image generating section 7 performs the arithmetic operation represented by Equation (7) using the signals kGs, Rs and Bs, thereby generating signals Ci1, Ci2 and Ci3. In this manner, multiple image signals with parallax can be generated with respect to the G component, too.

The image generated by performing the arithmetic operation represented by Equation (7) uses Gs to a lesser degree, and therefore, comes to have decreased sensitivity. That is why to increase the sensitivity, signals obtained by adding (1−k)Gs (where k is a real number that is equal to or greater than zero and less than one) to Rs and Bs may be added as represented by the following Equation (9):

$$\begin{pmatrix} Rs + (1-k)Gs \\ kGs \\ Bs + (1-k)Gs \end{pmatrix} = \begin{pmatrix} Mx11 & Mx12 & Mx13 \\ kMx21 & kMx22 & kMx23 \\ Mx31 & Mx32 & Mx33 \end{pmatrix} \begin{pmatrix} Ci1 \\ Ci2 \\ Ci3 \end{pmatrix} \quad (9)$$

In Equation (9), (1−k)Gs is added to each of Rs and Bs. However, that value does not have to be (1−k)Gs but may also be k'Gs (where k' is a real number that is greater than zero but equal to or smaller than one). If k'Gs is added to each of Rs and Bs, then Equation (9) is rewritten into the following Equation (10):

$$\begin{pmatrix} Rs + k'Gs \\ kGs \\ Bs + k'Gs \end{pmatrix} = \begin{pmatrix} Mx11 & Mx12 & Mx13 \\ kMx21 & kMx22 & kMx23 \\ Mx31 & Mx32 & Mx33 \end{pmatrix} \begin{pmatrix} Ci1 \\ Ci2 \\ Ci3 \end{pmatrix} \quad (10)$$

Figure 8:
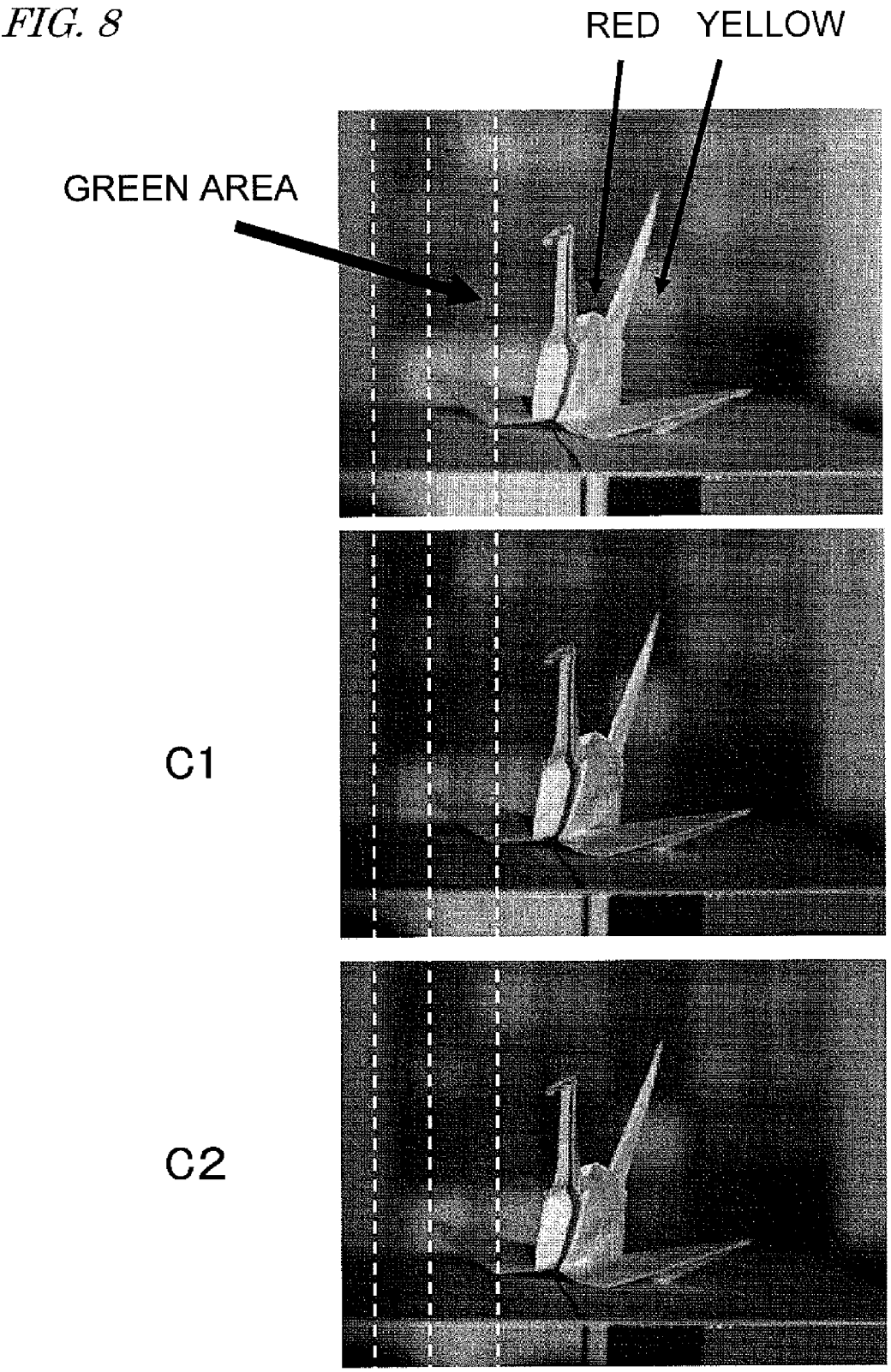
FIG. 8 Shows images generated by an image capture device according to the first embodiment with the sensitivity increased.

The images represented by the signals Ci1 and Ci2 that have been calculated by Equation (10) are shown respectively at the middle and bottom of FIG. 8. The other image shown at the top of FIG. 8 is the same as what is shown at the top of FIGS. 5 and 6. As can be seen from FIG. 8, two images that would make the viewer feel little unnaturalness and that have had their sensitivity improved can be obtained.

Gs is a signal representing the light that has been transmitted through the entire light-transmitting plate 2, and therefore, its incident light has no viewpoint dependence unlike Rs or Bs. That is why Gs can be regarded as indicating a brightness offset with respect to the entire image. Nevertheless, if k' is large, then the image gets brighter but the magnitude of parallax decreases. On the other hand, if k' is small, then the image gets darker but the magnitude of parallax increases. This is a characteristic of Gs.

According to the signal arithmetic processing described above, if the scene to be shot includes a lot of subjects that reflect a light ray falling within the green wavelength range, the parallax can be obtained more easily by decreasing the value of k'. On the other hand, if the scene to be shot includes a small number of subjects that reflect a light ray falling within the green wavelength range, an image that has a great magnitude of parallax and high sensitivity alike can be obtained by increasing the value of k'. An image capture device according to this embodiment can flexibly set the magnitude of parallax to be obtained according to the percentage of the green component that is included in part or all of the scene to be shot.

Furthermore, although the image signal generating section 7 of the embodiment described above can generate two images with parallax and can also generate a grayscale image and a color image with the incoming light used highly efficiently, not all of these images need to be generated. Rather, the image signal generating section 7 may also be configured to generate two image data with parallax to say the least.

In the foregoing description, the light-transmitting plate 2 that is made up of Cy and Ye filters and a transparent area is supposed to be used. However, the Ye filter may be replaced with a magenta (Mg) filter. If Cy and Mg filters are used in combination, then no parallax information about Bs can be obtained. In that case, by modifying Equation (7) so that a reduced weight is added to Bs just as a weight is added to Gs in Equation (7), two images with parallax that does not look unnatural can be generated. Specifically, Equation (7) may be modified into the following Equation (11):

$$\begin{pmatrix} Ci1 \\ Ci2 \\ Ci3 \end{pmatrix} = \begin{pmatrix} Mx11 & Mx12 & Mx13 \\ Mx21 & Mx22 & Mx23 \\ kMx31 & kMx32 & kMx33 \end{pmatrix}^{-1} \begin{pmatrix} Rs \\ Gs \\ kBs \end{pmatrix} \quad (11)$$

Alternatively, the Ye and Mg filters may also be used in combination. In that case, no parallax information about Rs can be obtained. Thus, by modifying Equation (7) so that a reduced weight is added to Rs, images with parallax that does not look unnatural can be obtained. Specifically, Equation (7) may be modified into the following Equation (12):

$$\begin{pmatrix} Ci1 \\ Ci2 \\ Ci3 \end{pmatrix} = \begin{pmatrix} kMx11 & kMx12 & kMx13 \\ Mx21 & Mx22 & Mx23 \\ Mx31 & Mx32 & Mx33 \end{pmatrix}^{-1} \begin{pmatrix} kRs \\ Gs \\ Bs \end{pmatrix} \quad (12)$$

As described above, the image capture device of this embodiment divides the light-transmitting plate 2 into three transmitting areas C1, C2 and C3 that have mutually different transmission wavelength ranges, and an image is shot using an image sensor 1 that has three kinds of pixels (R, G, B), thereby obtaining two images with parallax. On top of that, by adding a weight to a pixel signal representing a light ray with a color component (or wavelength range) that transmits the entire light-transmitting plate 2, two images with parallax that does not look unnatural can be obtained without changing the hardware configuration at all.

The image capture device of the embodiment described above generates images by performing signal arithmetic operations on the photoelectrically converted signals that have been obtained by capturing images. However, that processing of generating images through the signal arithmetic operations may be performed by an image processor that is provided independently of that image capture device. For example, even if a signal that has been obtained by an image capture device including the image capturing section 100 of this embodiment is loaded into another device to get a program defining the signal arithmetic processing described above executed by that another device, the effects of the embodiment described above can also be achieved.

In the embodiment described above, the light-transmitting plate 2 has three transmitting areas C1, C2 and C3, which are as many as the number of different kinds of photosensitive cells (R, G, B) included in each unit block of the array of photosensitive cells. However, according to the present invention, the number of transmitting areas and the number of different kinds of photosensitive cells do not have to be defined as in the example described above. For example, the number of different kinds of photosensitive cells included in each unit block may be greater than that of the transmitting areas. Even so, image information can also be obtained by performing signal arithmetic operations based on an equation representing the relation between the photoelectrically converted signal of each photosensitive cell and the quantity of light incident on its associated transmitting area. It should be noted that the "number of different kinds of photosensitive cells" means the number of different kinds of color components (or wavelength ranges) that can be sensed by multiple photosensitive cells included in a single unit block.

The number of transmitting areas of the light-transmitting plate (light-transmitting section) 2 may be two or more than three. Speaking more generally, the light-transmitting section 2 of the present invention may be configured to have n transmitting areas (where n is an integer that is equal to or greater than two), which have mutually different transmission wavelength ranges and each of which transmits a light ray falling within a first wavelength range. Also, each unit block of the photosensitive cell array may be comprised of n photosensitive cells including a first photosensitive cell that outputs a photoelectrically converted signal representing the quantity of light falling within a first wavelength range. In this case, the n photosensitive cells output photoelectrically converted signals representing the quantities of light rays that fall within mutually different wavelength ranges. Typically, a color filter is arranged to face each photosensitive cell. However, as disclosed in PCT International Application Japanese National Phase Patent Publication 2002-513145 cited above, an image sensor provided with no color filters may also be used.

For example, if n=2, the light-transmitting plate 2 may be split into two, one of which may be provided with a Cy filter and the other of which may be provided with a Ye filter. In that case, if each unit pixel block of the image sensor 1 is comprised of a photosensitive cell that senses a light ray falling within the G wavelength range and a photosensitive cell that senses a light ray falling within the Cy wavelength range, two images that have good parallax can be generated by the method described above.

Figure 9:
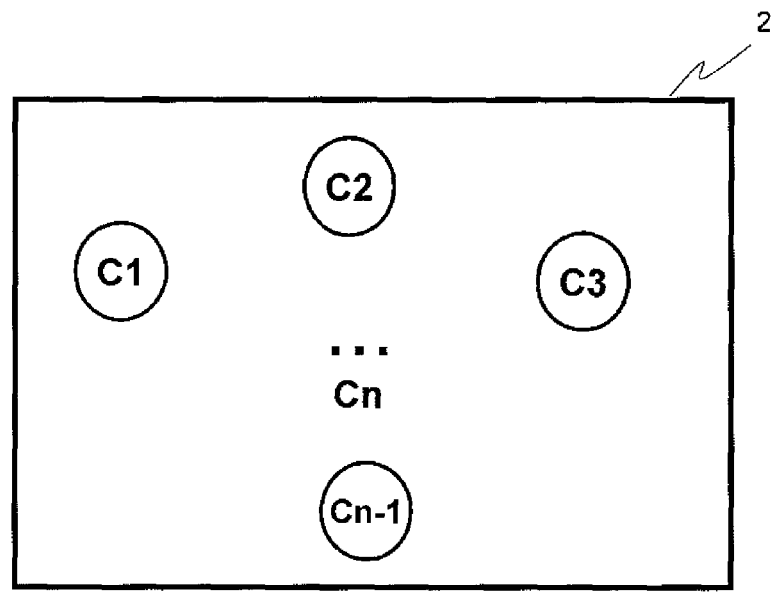
FIG. 9 A view illustrating an example of a light-transmitting section that has n transmitting areas.

FIG. 9 schematically illustrates an example of a generalized light-transmitting section 2, of which n is greater than three. The light-transmitting section 2 has a rectangular shape in the example illustrated in FIG. 9, but may also have any other shape. In this example, the light-transmitting section 2 has n transmitting areas C1 through Cn, which have mutually different transmission wavelength ranges. Although the transmitting areas C1 through Cn−1 are circular areas of the same size and the other area is a transmitting area Cn, the shape, size and locations of the respective areas do not have to be the illustrated ones. In any case, from the standpoint of optical efficiency, it would be beneficial that the transmitting areas C1 through Cn are designed either to be transparent or to transmit a light ray falling within a wavelength range representing a complementary color.

Figure 10:
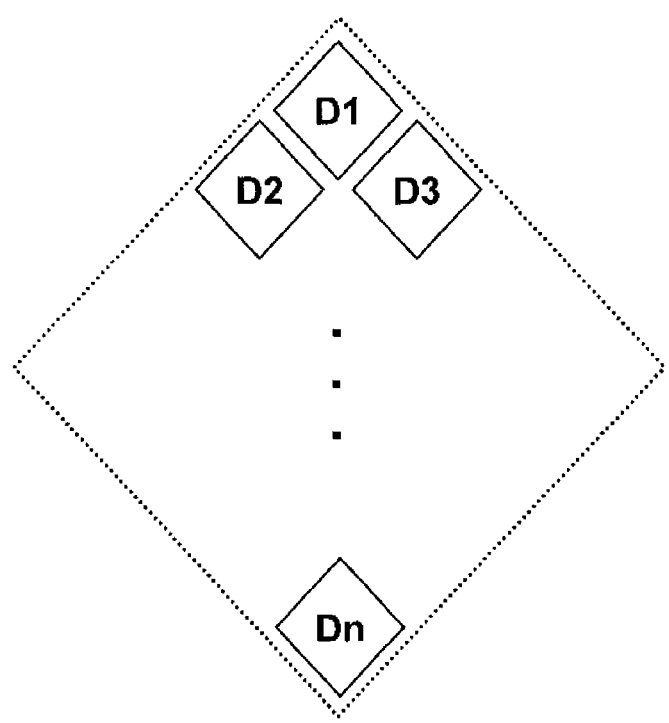
FIG. 10 A view illustrating an exemplary arrangement of n photosensitive cells in each unit block.
Figure 11:
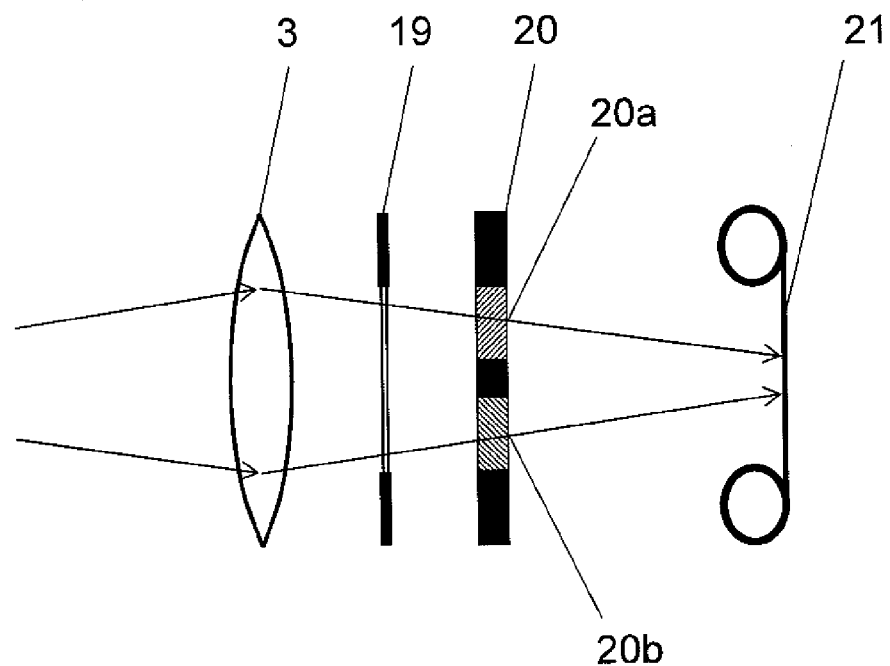
FIG. 11 A schematic representation illustrating an image capturing system according to Patent Document No. 1.
Figure 12:
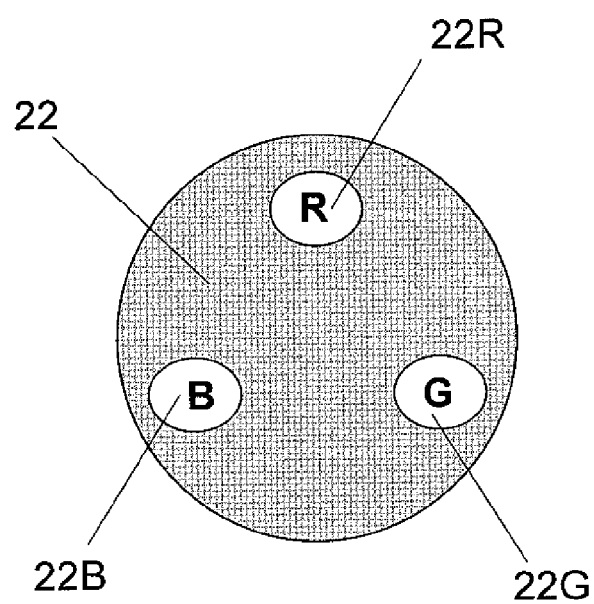
FIG. 12 A schematic representation illustrating a light beam confining plate according to Patent Document No. 2.
Figure 13:
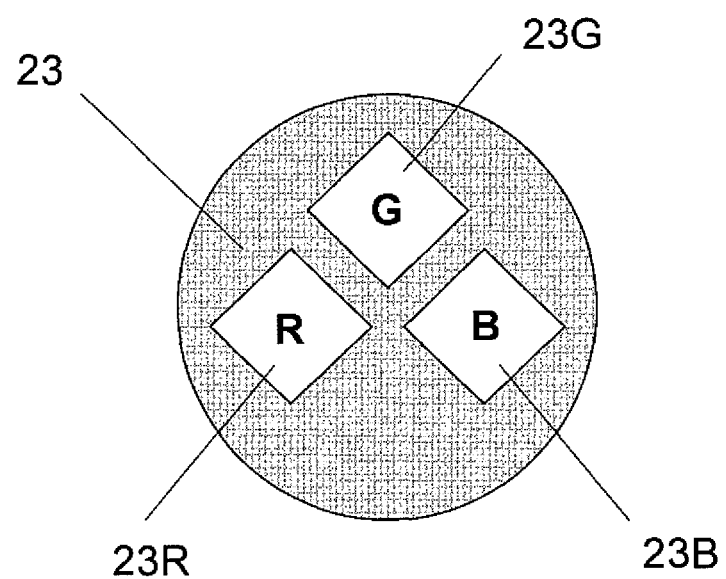
FIG. 13 A schematic representation illustrating a light beam confining plate according to Patent Document No. 3.

FIG. 10 illustrates an exemplary arrangement of photosensitive cells in each unit block of the photosensitive cell array when such generalization is adopted. As shown in FIG. 10, each unit element is comprised of photosensitive cells D1 through Dn, which may be configured to sense light rays falling within mutually different wavelength ranges through color filters. It should be noted that the photosensitive cells do not have to be arranged as shown in FIG. 10 but may also be arranged in any other pattern.

If such generalization is adopted, the relation between image signals Ci1, Ci2, . . . and Cin representing light rays that have been incident on respective transmitting areas of the light-transmitting section 2 and n photoelectrically converted signals Ds1, Ds2, . . . and Dsn to be output from the respective photosensitive cells of the image sensor 1 can be given by the following Equation (13):

$$\begin{pmatrix} Ds1 \\ Ds2 \\ Ds3 \\ \vdots \\ Dsn \end{pmatrix} = \begin{pmatrix} Mx11 & Mx12 & Mx13 & \ldots & Mx1n \\ Mx21 & Mx22 & Mx23 & \ldots & Mx2n \\ Mx31 & Mx32 & Mx33 & \ldots & Mx3n \\ \vdots & \vdots & \vdots & \ddots & \vdots \\ Mxn1 & Mxn2 & Mxn3 & \ldots & Mxnn \end{pmatrix} \begin{pmatrix} Ci1 \\ Ci2 \\ Ci3 \\ \vdots \\ Cin \end{pmatrix} \quad (13)$$

If pieces of image information Ci1 through Cin are obtained by Equation (13), the optical properties of the image capturing system had better be determined so as to prevent the n×n matrix determinant, consisting of elements Mx11 through Mxnn, from having a value that is close to zero. If the inverse matrix of the n×n matrix represented by Equation (13) consists if elements iM11 through iMnn, then Equation (13) may be modified into the following Equation (14):

$$\begin{pmatrix} Ci1 \\ Ci2 \\ Ci3 \\ \vdots \\ Cin \end{pmatrix} = \begin{pmatrix} iM11 & iM12 & iM13 & \ldots & iM1n \\ iM21 & iM22 & iM23 & \ldots & iM2n \\ iM31 & iM32 & iM33 & \ldots & iM3n \\ \vdots & \vdots & \vdots & \ddots & \vdots \\ iMn1 & iMn2 & iMn3 & \ldots & iMnn \end{pmatrix} \begin{pmatrix} Ds1 \\ Ds2 \\ Ds3 \\ \vdots \\ Dsn \end{pmatrix} \quad (14)$$

By performing the signal arithmetic operations represented by Equation (14), signals Ci1 through Cin representing the quantities of light rays that are incident on the transmitting areas C1 through Cn can be generated based on the photoelectrically converted signals Ds1 through Dsn. As a result, n image data with parallax can be generated.

Nevertheless, even if such generalization is adopted, the light ray falling within the first wavelength range is transmitted through every transmitting area, and therefore, no parallax information can be obtained as for the light ray falling within the first wavelength range, which is a problem. Thus, to overcome such a problem, the image generating section 7 calculates the signals Ci1 through Cin associated with the respective transmitting areas by using a signal kDs1, which is the output signal Ds1 of the first photosensitive cell multiplied by a coefficient k (where k is a real number that is equal to or greater than zero and less than one), instead of Ds1. That is to say, Equations (13) and (14) described above are replaced with the following Equations (15) and (16):

$$\begin{pmatrix} kDs1 \\ Ds2 \\ Ds3 \\ \vdots \\ Dsn \end{pmatrix} = \begin{pmatrix} kMx11 & kMx12 & kMx13 & \ldots & kMx1n \\ Mx21 & Mx22 & Mx23 & \ldots & Mx2n \\ Mx31 & Mx32 & Mx33 & \ldots & Mx3n \\ \vdots & \vdots & \vdots & \ddots & \vdots \\ Mxn1 & Mxn2 & Mxn3 & \ldots & Mxnn \end{pmatrix} \begin{pmatrix} Ci1 \\ Ci2 \\ Ci3 \\ \vdots \\ Cin \end{pmatrix} \quad (15)$$

$$\begin{pmatrix} Ci1 \\ Ci2 \\ Ci3 \\ \vdots \\ Cin \end{pmatrix} = \begin{pmatrix} kMx11 & kMx12 & kMx13 & \ldots & kMx1n \\ Mx21 & Mx22 & Mx23 & \ldots & Mx2n \\ Mx31 & Mx32 & Mx33 & \ldots & Mx3n \\ \vdots & \vdots & \vdots & \ddots & \vdots \\ Mxn1 & Mxn2 & Mxn3 & \ldots & Mxnn \end{pmatrix}^{-1} \begin{pmatrix} kDs1 \\ Ds2 \\ Ds3 \\ \vdots \\ Dsn \end{pmatrix} \quad (16)$$

Also, in the images represented by the signals Ci1 through Cin that are obtained by Equation (15), the percentage of the light ray falling within the first wavelength range decreases, and therefore, its luminance decreases, too. For that reason, a signal obtained by multiplying Ds1 by k' (where k' is a real number that is greater than zero and equal to or smaller than one) may be added to the signals Ds2 through Dsn. In that case, Equations (15) and (16) may be replaced with the following Equations (17) and (18):

$$\begin{pmatrix} kDs1 \\ Ds2 + k'Ds1 \\ Ds3 + k'Ds1 \\ \vdots \\ Dsn + k'Ds1 \end{pmatrix} = \begin{pmatrix} kMx11 & kMx12 & kMx13 & \ldots & kMx1n \\ Mx21 & Mx22 & Mx23 & \ldots & Mx2n \\ Mx31 & Mx32 & Mx33 & \ldots & Mx3n \\ \vdots & \vdots & \vdots & \ddots & \vdots \\ Mxn1 & Mxn2 & Mxn3 & \ldots & Mxnn \end{pmatrix} \begin{pmatrix} Ci1 \\ Ci2 \\ Ci3 \\ \vdots \\ Cin \end{pmatrix} \quad (17)$$

$$\begin{pmatrix} Ci1 \\ Ci2 \\ Ci3 \\ \vdots \\ Cin \end{pmatrix} = \begin{pmatrix} kMx11 & kMx12 & kMx13 & \ldots & kMx1n \\ Mx21 & Mx22 & Mx23 & \ldots & Mx2n \\ Mx31 & Mx32 & Mx33 & \ldots & Mx3n \\ \vdots & \vdots & \vdots & \ddots & \vdots \\ Mxn1 & Mxn2 & Mxn3 & \ldots & Mxnn \end{pmatrix}^{-1} \begin{pmatrix} kDs1 \\ Ds2 + k'Ds1 \\ Ds3 + k'Ds1 \\ \vdots \\ Dsn + k'Ds1 \end{pmatrix} \quad (18)$$

If images are generated based on the signals Ci1 through Cin that have been obtained by Equations (17) and (18), multiple images with parallax can be generated with their luminance increased.

In this case, the coefficient k may be set to be constant for a single image or may also be determined on a unit block basis. The coefficient k may be determined arbitrarily as long as k is set to be a small value if the quantity of the light ray falling within the first wavelength range is smaller than that of a light ray falling within any other range but to be a large value if the former quantity is greater than the latter. For example, k may be determined based on the ratio of the photoelectrically converted signal supplied from the first photosensitive cell in each unit block to the sum of the photoelectrically converted signals supplied from the other photosensitive cells in that unit block. Also, the coefficient k' may be determined either independently of the coefficient k or based on the value of k. For instance, the coefficient k' may be set to satisfy k'==1−k as described above.

Optionally, the image capture device of the present invention may also be configured to generate at least two of the signals C11 through Cin, not all of them. Even so, at least two image data can also be obtained, and therefore, parallax information can be obtained as well.

INDUSTRIAL APPLICABILITY

A 3D image capture device according to the present invention can be used effectively in any camera that ever uses a solid-state image sensor. Examples of those cameras include consumer electronic cameras such as digital still cameras and digital camcorders and solid-state surveillance cameras for industrial use.

REFERENCE SIGNS LIST 1 solid-state image sensor
1a imaging area of solid-state image sensor
2 light-transmitting plate (light-transmitting section)
3 optical lens
4 infrared cut filter
5 signal generating and receiving section
6 sensor driving section
7 image generating section
8 interface section
9 subject
19 lens diaphragm
20, 22, 23 light beam confining plate
20a color filter that transmits red based ray
20b color filter that transmits blue based ray
21 photosensitive film
22R, 23R R ray transmitting area of light beam confining plate
22G, 23G G ray transmitting area of light beam confining plate
22B, 23B B ray transmitting area of light beam confining plate
30 memory
100 image capturing section
110 color filter
120 photosensitive cell
200 signal processing section

The invention claimed is:

1. A 3D image capture device comprising:
a light-transmitting plate including n transmitting areas, (where n is an integer that is equal to or greater than three), that have mutually different transmission wavelength ranges, each of the different transmission wavelength ranges including a first wavelength range;
the n transmitting areas include a first transmitting area, a second transmitting area and a third transmitting area;
the first and second transmitting areas are surrounded by the third transmitting area;
the first transmitting area is made of a member that transmits a light ray falling within one of the cyan, yellow and magenta wavelength ranges;
the second transmitting area is made of a member that transmits a light ray falling within another one of the cyan, yellow and magenta wavelength ranges;
the third transmitting area is made of a transparent member;
the third transmitting area is larger than the first and second transmitting areas;
a solid-state image sensor which includes a photosensitive cell array and which is arranged to receive the light rays that have been transmitted through the n transmitting areas of the light-transmitting section, the photosensitive cell array including a plurality of unit blocks, each said unit block including n photosensitive cells, including a first photosensitive cell that receives light rays falling within the first wavelength range which have been transmitted through the n transmitting areas and that outputs a photoelectrically converted signal representing the intensity of the light rays falling within the first wavelength range received, the n photosensitive cells configured to receive light rays falling within mutually different wavelength ranges and output photoelectrically converted signals representing the respective intensity of light rays received;
an optical system which produces an image of light rays transmitted through each areas of the light transmitting plate on an imaging area of the solid-state image sensor; and
a signal processor which:
generates signals representing the intensity of light rays that have been incident on the respective areas of the light-transmitting plate using a signal which is obtained by multiplying the photoelectrically converted signal supplied from the first photosensitive cell by a first coefficient, which is a real number that is equal to or greater than zero but less than one, the photoelectrically converted signals supplied from the other photosensitive cells, and spectral transmittances of the n transmitting areas; and
generates at least two image data with parallax using the signals representing the intensity of light rays that have been incident on the respective areas.

2. The 3D image capture device of claim 1, wherein two of the n transmitting areas are an area that transmits light rays falling within the cyan wavelength range and an area that transmits light rays falling within the yellow wavelength range, and
wherein the first wavelength range is a wavelength range associated with the color green.

3. The 3D image capture device of claim 1, wherein the value of the first coefficient is determined on a unit block basis.

4. The 3D image capture device of claim 1, wherein the value of the first coefficient is determined based on the ratio of the photoelectrically converted signal that has been output from the first photosensitive cell of each said unit block to the sum of the photoelectrically converted signals that have been output from the other photosensitive cells thereof.

5. The 3D image capture device of claim 1, wherein the signal processor generates signals representing the quantities of light rays that have been incident on the respective areas of the light-transmitting section using the sums of a signal which is obtained by multiplying the photoelectrically converted signal supplied from the first photosensitive cell by a second coefficient, which is a real number that is greater than zero but equal to or smaller than one, and the photoelectrically converted signals supplied from the other photosensitive cells.

6. The 3D image capture device of claim 5, wherein the value of the second coefficient is determined based on the value of the first coefficient.

7. The 3D image capture device of claim 6, wherein if the values of the first and second coefficients are identified by k and k', respectively, k'=1−k.

8. The 3D image capture device of claim 1, wherein the third transmitting area transmits visible radiation across the entire wavelength range of white light.

9. An image processor that processes a signal that has been obtained by a 3D image capture device that comprises:
a light-transmitting plate including n transmitting areas, where n is an integer that is equal to or greater than three, that have mutually different transmission wavelength ranges, each of the different transmission wavelength ranges including a first wavelength range;
the n transmitting areas include a first transmitting area, a second transmitting area and a third transmitting area;
the first and second transmitting areas are surrounded by the third transmitting area;
the first transmitting area is made of a member that transmits a light ray falling within one of the cyan, yellow and magenta wavelength ranges;

the second transmitting area is made of a member that transmits a light ray falling within another one of the cyan, yellow and magenta wavelength ranges;

the third transmitting area is made of a transparent member;

the third transmitting area is larger than the first and second transmitting areas;

a solid-state image sensor which includes a photosensitive cell array and which is arranged to receive the light rays that have been transmitted through the n transmitting areas of the light-transmitting section, the photosensitive cell array including a plurality of unit blocks, each said unit block including N photosensitive cells including a first photosensitive cell that receives light rays falling within the first wavelength range which have been transmitted through the n transmitting areas and that outputs a photoelectrically converted signal representing the intensity of light rays falling within the first wavelength range received, the n photosensitive cells configured to receive light rays falling within mutually different wavelength ranges and output photoelectrically converted signals representing the respective intensity of light rays received; and an optical system which produces an image of light rays transmitted through each areas of the light transmitting plate on an imaging area of the solid-state image sensor, wherein the image processor:

generates signals representing the intensity of light rays that have been incident on the respective areas of the light-transmitting plate using a signal which is obtained by multiplying the photoelectrically converted signal supplied from the first photosensitive cell by a first coefficient, which is a real number that is equal to or greater than zero but less than one, the photoelectrically converted signals supplied from the other photosensitive cells, and spectral transmittances of the n transmitting areas; and generates at least two image data with parallax using the signals representing the intensity of light rays that have been incident on the respective areas.

10. The 3D image capture device of claim 9, wherein the third transmitting area transmits visible radiation across the entire wavelength range of white light.

* * * * *